United States Patent
Oh et al.

(10) Patent No.: US 10,766,475 B2
(45) Date of Patent: Sep. 8, 2020

(54) DEVICE FOR PREVENTING DILUTION OF ENGINE OIL

(71) Applicants: Hyundai Motor Company, Seoul (KR); Kia Motors Corporation, Seoul (KR)

(72) Inventors: Sung Jong Oh, Suwon-si (KR); Sung Moon Cho, Hwaseong-si (KR); Yong Jun Choi, Suwon-si (KR); Yun Sik Jang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/401,683

(22) Filed: May 2, 2019

(65) Prior Publication Data

US 2020/0164851 A1 May 28, 2020

(30) Foreign Application Priority Data

Nov. 23, 2018 (KR) .................... 10-2018-0146043

(51) Int. Cl.
 *B60W 10/06* (2006.01)
 *F01M 5/02* (2006.01)
 *B60W 10/30* (2006.01)
(52) U.S. Cl.
 CPC ............ *B60W 10/06* (2013.01); *B60W 10/30* (2013.01); *F01M 5/021* (2013.01); *F02D 2250/11* (2013.01)

(58) Field of Classification Search
 CPC ...... B60W 10/06; B60W 10/30; F01M 5/021; F02D 2250/11
 See application file for complete search history.

(56) References Cited

U.S. PATENT DOCUMENTS

| 4,458,642 A * | 7/1984 | Okubo ................... F01M 13/00 123/196 AB |
| 4,756,359 A * | 7/1988 | Greer ................. B60H 1/00007 122/26 |
| 6,053,143 A * | 4/2000 | Taylor ................... F16N 39/005 123/1 A |
| 7,966,988 B2 * | 6/2011 | Weldon .................. F01M 11/10 123/196 AB |

(Continued)

FOREIGN PATENT DOCUMENTS

| DE | 102018100356 A1 * | 7/2018 | ............... F01N 3/10 |
| JP | 53067037 A * | 6/1978 | |

(Continued)

*Primary Examiner* — Hung Q Nguyen
(74) *Attorney, Agent, or Firm* — Slater Matsil, LLP

(57) ABSTRACT

A device for preventing dilution of engine oil includes an oil pan in which oil for lubrication of the engine is recovered with fuel. An exhaust purifier is provided on a rear end of the engine and purifying exhaust gas. A gas passage can guide flow of exhaust gas passing through the exhaust purifier to the oil pan. A gas valve can control flow rate of the exhaust gas flowing in the gas passage. A controller controls an opening ratio of the gas valve depending on a temperature of oil inside the oil pan to maintain the temperature of the oil equal to or higher than a temperature at which the fuel in the oil pan is vaporized.

20 Claims, 2 Drawing Sheets

(56) References Cited

U.S. PATENT DOCUMENTS

| | | | | |
|---|---|---|---|---|
| 2003/0006032 A1* | 1/2003 | Nakagawa | ................ | F02G 5/02 |
| | | | | 165/202 |
| 2007/0272174 A1* | 11/2007 | Szalony | .................. | F01P 11/20 |
| | | | | 123/41.14 |
| 2008/0053217 A1* | 3/2008 | Nishio | .................. | F02D 41/029 |
| | | | | 73/291 |
| 2011/0094483 A1* | 4/2011 | Suh | ........................ | F02M 26/28 |
| | | | | 123/568.12 |
| 2012/0042845 A1* | 2/2012 | Kanai | .................... | F01M 5/001 |
| | | | | 123/196 AB |
| 2012/0180456 A1* | 7/2012 | Yamada | .............. | F02D 41/0235 |
| | | | | 60/274 |
| 2016/0010520 A1* | 1/2016 | Will | ...................... | F01M 5/021 |
| | | | | 123/196 AB |
| 2016/0369719 A1* | 12/2016 | Kim | ................... | F02D 19/0615 |

FOREIGN PATENT DOCUMENTS

| | | | | | |
|---|---|---|---|---|---|
| JP | 2010285892 A | * | 12/2010 | | |
| JP | 2014005768 A | * | 1/2014 | | |
| JP | 2014228269 A | * | 12/2014 | | |
| JP | 2016169625 A | * | 9/2016 | | |
| JP | 2016176396 A | * | 10/2016 | ............ | Y02T 10/16 |
| KR | 20040033790 A | * | 4/2004 | | |
| WO | WO 2007042675 A1 | * | 4/2007 | ......... | F01M 11/0004 |

* cited by examiner

DEVICE FOR PREVENTING DILUTION OF ENGINE OIL

CROSS-REFERENCE TO RELATED APPLICATIONS

This application claims priority to Korean Patent Application No. 10-2018-0146043, filed on Nov. 23, 2018, which application is hereby incorporated herein by reference.

TECHNICAL FIELD

The disclosure generally relates to a device for preventing dilution of engine oil

BACKGROUND

Generally, oil dilution means that fuel component is diluted in oil in an oil pan of an engine, which reduces lubrication performance of the oil. In a case of a diesel engine, fuel is accumulated on an oil pan during a process of warming up for using a lean NOx trap (LNT) and a diesel particulate filter (DPF), and oil dilution occurs.

When the oil dilution in which the fuel is diluted in the oil in the oil pan excessively occurs, engine problems occur due to lubrication performance degradation.

A main reason for the oil dilution with fuel in the oil pan is an after-injection of the fuel for increasing temperature of LNT and DPF. When purifying exhaust using LNT and DPF, the exhaust gas cannot be purified without increasing temperature of LNT and DPF. Therefore, though the after-injection of the fuel is optimally controlled for suppressing the oil dilution, the oil dilution occurs.

The foregoing is intended merely to aid in the understanding of the background of the present invention, and is not intended to mean that the present invention falls within the purview of the related art that is already known to those skilled in the art.

SUMMARY

The disclosure generally relates to a device for preventing dilution of engine oil. Particular embodiments relate to a device for preventing dilution of engine oil by suppressing dilution of engine oil by fuel, thus securing desired engine lubrication performance of oil.

Embodiments of the present invention can address the above problems occurring in the related art. For example, embodiments propose a device for preventing dilution of engine oil, the device vaporizing fuel in an oil pan by increasing a temperature of oil in the oil pan using exhaust gas of the diesel engine, thereby suppressing engine oil dilution and securing desired engine lubrication performance of engine oil.

According to one aspect of the present invention, there is provided a device for preventing dilution of engine oil. The device includes an oil pan in which oil for lubrication of the engine is recovered with fuel. An exhaust purifier is provided on a rear end of the engine and purifying exhaust gas. A gas passage can guide flow of exhaust gas passing through the exhaust purifier to the oil pan. A gas valve can control flow rate of the exhaust gas flowing in the gas passage. A controller controls an opening ratio of the gas valve depending on a temperature of oil inside the oil pan to maintain the temperature of the oil equal to or higher than a temperature at which the fuel in the oil pan is vaporized.

Specifically, the gas passage may be disposed to pass through the oil pan, and the oil and fuel inside the oil pan may be heated by the exhaust gas flowing in the gas passage. The gas passage may pass through the oil pan and be extended to an integrated cooler, and the gas valve may be provided on the gas passage between the oil pan and integrated cooler. The integrated cooler may cool the exhaust gas passing through the oil pan by heat-exchange using cooling water. The cooling water may cool oil circulated between the oil pan and the integrated cooler. The exhaust gas cooled by the integrated cooler may be discharged to a side of a compressor and be supplied to a side of the engine by the compressor.

Meanwhile, when the temperature of the oil in the oil pan is equal to or higher than a critical temperature, the controller may control the opening ratio of the gas valve to zero. Preferably, when a temperature of at least any one of the gas passage, the oil pan, and the integrated cooler is higher than a heat damage generation temperature, the controller may control the opening ratio of the gas valve to zero. In addition, when a temperature of the cooling water of the integrated cooler for cooling the oil and exhaust gas exceeds a limit temperature, the controller may control the opening ratio of the gas valve to zero.

According to the device for preventing dilution of the engine oil, the following effects can be obtained.

1. The fuel mixed in the oil in an oil pan is vaporized using the exhaust gas (LP EGR gas) of the diesel engine, and the oil dilution can be reduced by vaporizing the fuel. Accordingly, it is possible to prevent engine problems due to lubrication performance degradation such as dieseling or piston scuffing, which occurs when the oil dilution is excessive.

2. As the temperature of the oil in the oil pan rises, viscosity of the oil is lowered, and accordingly friction of the engine is reduced, so that fuel efficiency can be improved.

3. Since an integrated cooler with integrated functions of an existing oil cooler and an LP-EGR cooler is applied, engine layout can be simplified.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Figure 1:
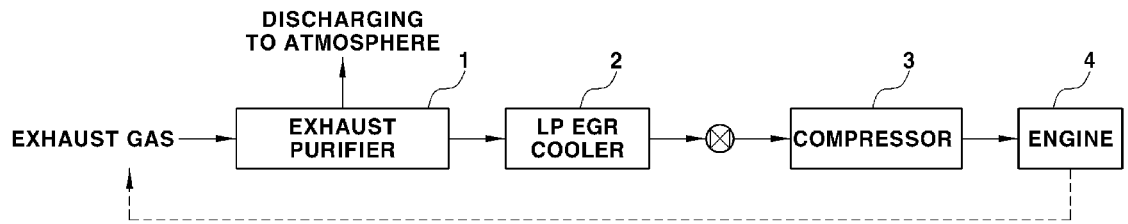
FIG. 1 is a partial view showing an exhaust system of a conventional diesel engine.

Hereinbelow, exemplary embodiments of the present invention will be described in detail with reference to the accompanying drawings. Throughout the drawings, the same reference numerals will refer to the same or like parts.

First, an exhaust system of a conventional diesel engine will be described with reference to FIG. 1.

The conventional diesel engine applies an exhaust gas recirculation (EGR) system for recirculating a portion of exhaust gas generated in the engine back to an engine suction system and an exhaust after-treatment system for purifying exhaust gas discharged to the engine exhaust system and emitting the exhaust gas to the atmosphere.

Referring to FIG. 1, the EGR system includes a LP-EGR cooler 2 for cooling exhaust gas (that is, LP-EGR gas) recirculated to the engine suction system, and a compressor (a compressor of a turbo charger) 3 forcibly sending the LP-EGR gas passing through the LP-EGR cooler 2 to the engine 4.

The exhaust after-treatment system includes a selective Catalytic Reduction (SCR), a lean NOx trap (LNT), and a diesel particulate filter (DPF), which are provided on the engine exhaust system. The SCR and the LNT are devices for reducing amount of nitrogen oxides (NOx) in the exhaust gas using a catalyst, and the DPF is a device for filtering particulate matter in the exhaust gas. That is, the SCR and the LNT and the DPF are respectively exhaust purifiers for vehicle. In other words, the SCR and the LNT are respectively catalystic converters for vehicle.

In case of the diesel engine using such exhaust system, engine fuel flows in an oil pan during a warming up process for using the exhaust purifier 1. Thus, oil dilution occurs by the fuel entering in the oil pan and lubrication performance of oil is degraded.

Therefore, the device of the present invention raises a temperature of oil in an oil pan using the LP-EGR gas, in order to prevent oil in the oil pan of the diesel engine from being diluted with fuel. As the temperature of the oil rises, the fuel diluted with the oil is vaporized to suppress oil dilution, thereby securing engine lubrication performance of the oil.

Hereinbelow, the present invention will be described in detail with reference to accompanying drawings in order that the invention can be easily embodied by one of ordinary skill in the art to which this invention belongs.

Figure 2:
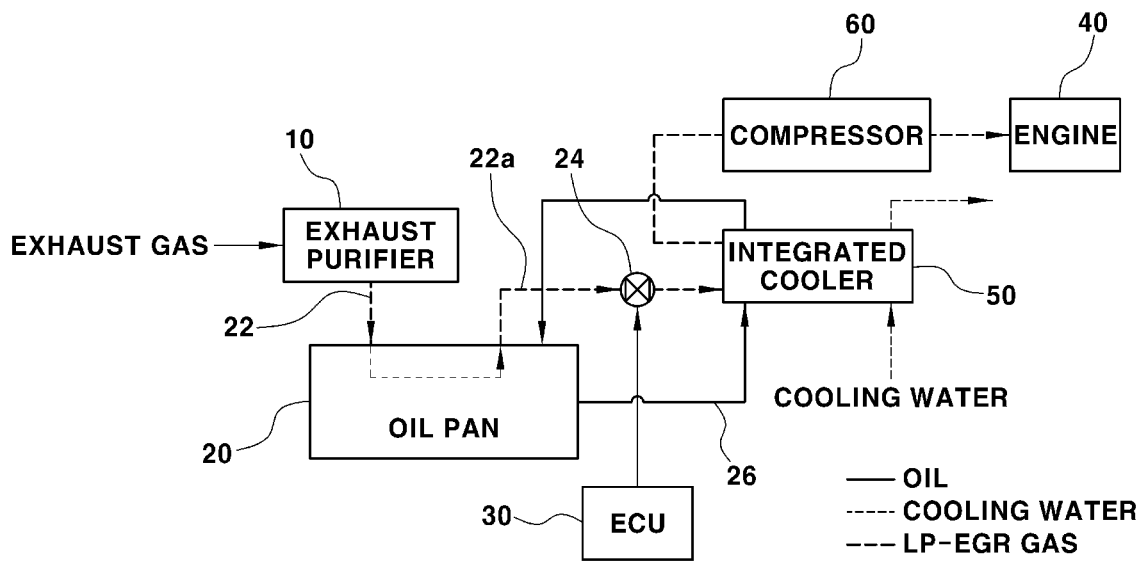
FIG. 2 is a block diagram showing a device for preventing dilution of engine oil according to the present invention.
Figure 3:
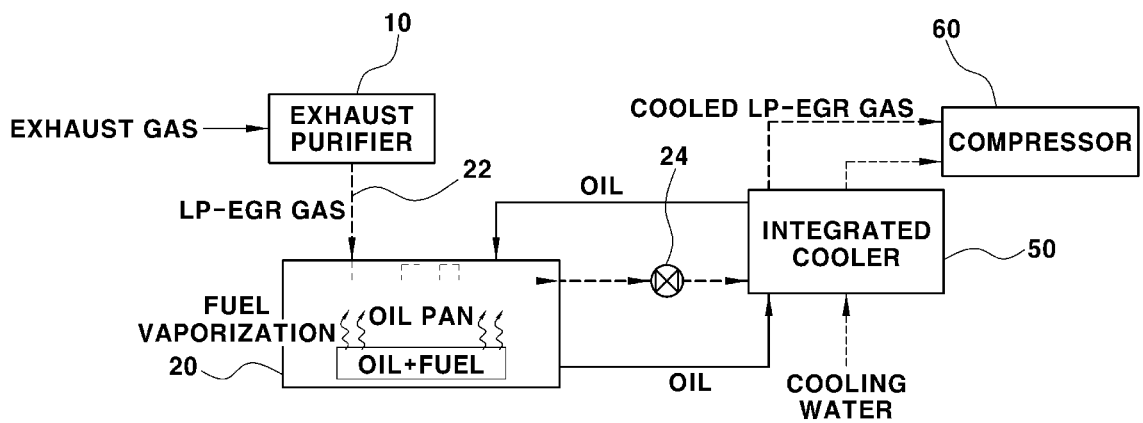
FIG. 3 is a schematic view showing operation mechanism of the device for preventing dilution of engine oil according to the present invention.
Figure 4:
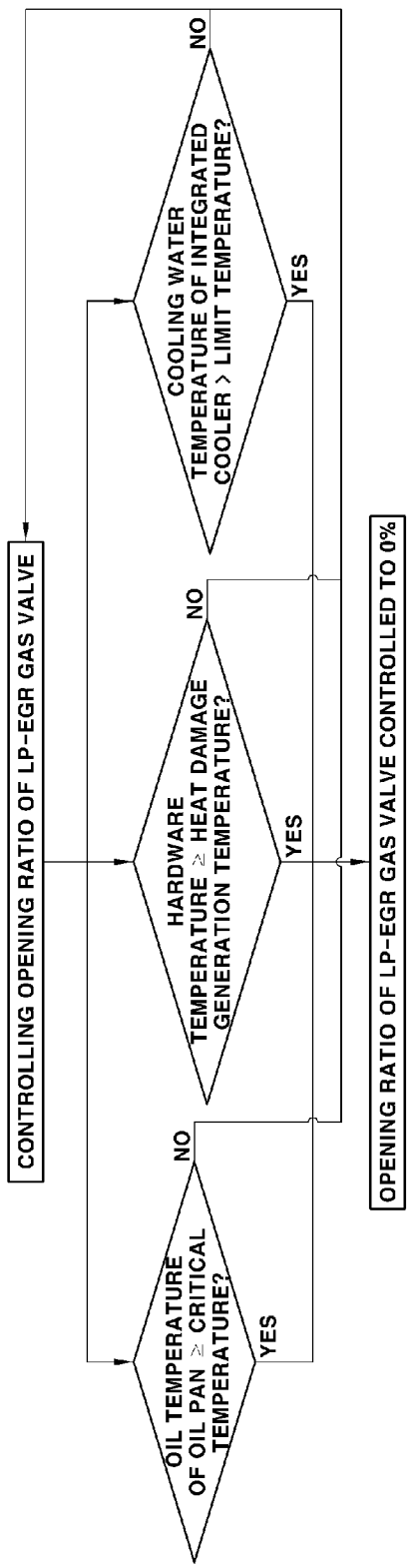
FIG. 4 is a flowchart showing a control process for preventing overheating of cooling water and heat damage to hardware.

FIG. 2 is a block diagram showing a device for preventing dilution of engine oil of the present invention, FIG. 3 is a schematic view showing operation mechanism of the device for preventing dilution of engine oil of the present invention, and FIG. 4 is a flowchart showing a control process for preventing overheating of cooling water and heat damage to hardware.

As shown in FIG. 2, the device for preventing dilution of engine oil of the present invention may include a LP-EGR gas passage 22 for allowing and guiding a flow of exhaust gas passing through the exhaust purifier 10 to the oil pan 20, a LP-EGR gas valve 24 for controlling flow rate per unit time of the exhaust gas (LP-EGR gas) flowing in the LP-EGR gas passage 22, and a controller 30 that controls an opening ratio (%, or opening rate) of the gas valve 24 to maintain a temperature of oil (oil including fuel) in the oil pan 20 at a proper level. As the temperature of the oil in the oil pan 20 is maintained at the proper level, fuel diluted in the oil may be vaporized (referring to FIG. 3).

The oil pan 20 may be provided on a diesel engine, and the exhaust purifier 10 for purifying exhaust gas may be provided on a rear end (outlet side) of the diesel engine. The controller 30 may be a previously provided engine controller for performing overall control of the diesel engine.

In the oil pan 20, engine oil for engine lubrication is stored, and the oil flows from the oil pan 20 to an engine side for engine lubrication, and the oil fulfilling engine lubrication is recovered to the oil pan 20. When the oil is recovered to the oil pan 20, engine fuel may flow in the oil pan 20 with the oil.

The gas passage 22 may guide exhaust gas discharged from the diesel engine 40 to the oil pan 20. The exhaust gas guided to the oil pan 20 through the gas passage 22 may flow through the oil pan 20 by the gas passage 22. That is, the gas passage 22 may be disposed to pass through the oil pan 20. The exhaust gas may pass the oil pan 20 in order to perform heat exchange with the oil in the oil pan 20. The exhaust gas may heat the oil and fuel in the oil pan 20 to raise temperature of the oil and fuel. The gas passage 22 may be implemented by a gas pipe disposed between the exhaust purifier 10 and the oil pan 20 of the diesel engine 40. The gas pipe may provide the gas passage 22 through which exhaust gas passing through the exhaust purifier 10 may flow through the oil pan 20. The gas passage 22 may pass through the oil pan 20 and be extended to an integrated cooler 50 and a compressor 60.

The opening (or closing) of the gas valve 24 is variably controlled depending on the temperature of the oil in the oil pan 20. The gas valve 24 is provided on the gas passage 22a disposed between the oil pan 20 and the integrated cooler 50. Depending on the opening ratio of the gas valve 24, flow of exhaust gas (that is, LP-EGR gas) passing through the oil pan 20 per unit time may be controlled. As the flow of the exhaust gas is controlled, the temperature of the oil in the oil pan 20 may be maintained at a point equal to or higher than a predetermined temperature (that is, a reference temperature). The reference temperature may be set to a temperature value at which fuel included in the oil in the oil pan 20 begins to be vaporized.

The controller 30 controls the opening ratio of the gas valve 24 depending on the temperature of the oil in the oil pan 20, and with controlling the opening ratio of the gas valve 24, the controller 30 may maintain the temperature of the oil within a desired range. By the controller 30, the temperature of the oil may be maintained at a point between a value equal to or higher than the reference temperature and a value less than a critical temperature. The critical temperature may be set to a temperature value for preventing heat damage to hardware in which the exhaust gas (LP-EGR gas) passing through the exhaust purifier 10 flows. In addition, the critical temperature may be set below a limit temperature of cooling water for cooling the engine oil. The hardware may include the gas passage 22, the gas valve 24, the oil pan 20, and the integrated cooler 50.

The exhaust gas passing through the oil pan 20 is lowered in temperature by heating the oil in the oil pan 20, but the exhaust gas may not be lowered in temperature to a temperature suitable for flowing in the compressor 60. Therefore, the integrated cooler 50 for cooling the exhaust gas passing through the oil pan 20 may be provided on a rear end of the gas valve 24. The integrated cooler 50 may be provided between the gas valve 24 and the compressor 60. The integrated cooler 50 may cool exhaust gas using cooling water for cooling the oil in the oil pan 20. The integrated cooler 50 may cool exhaust gas passing through the oil pan 20 by heat exchange using cooling water. The cooling water is refrigerant for cooling oil circulated between the oil pan 20 and the integrated cooler 50. In other words, the cooling water is a refrigerant that cools the oil introduced into the integrated cooler 50 from the oil pan 20.

The exhaust purifier 10 may be connected to a front end (inlet side connected to the gas passage) of the oil pan 20 through the gas passage 22. During a warming up process for normal operation of the exhaust purifier 10, a rear end temperature of the exhaust purifier 10 (outlet side temperature) is maintained at a predetermined high temperature condition (for example, about 600 to 900° C.), depending on a driving condition of the diesel engine 40. As exhaust gas (LP-EGR gas) passing through the exhaust purifier 10 is heated, the hardware may suffer heat damage.

Therefore, the controller 30 detects the temperature of the oil in the oil pan 20 heated by LP-EGR gas, in real time, and controls the opening ratio of the gas valve 24 to zero when the temperature of the oil is equal to or higher the critical temperature (referring to FIG. 4). The temperature of the oil may be detected by a temperature sensor provided on the oil pan.

The controller 30 reduces the opening ratio of the gas valve 24 in phases as the temperature of the oil rises, and controls the opening ratio of the gas valve 24 to zero when the temperature of the oil reaches to a critical temperature. That is, when the temperature of the oil is equal to or higher than the critical temperature, the controller 30 closes the gas valve 24 to stop the flow of LP-EGR gas in the LP-EGR gas passage 22. The gas valve 24 may remain closed until the temperature of the oil pan 20 is lower than the critical temperature by more than a predetermined value. The critical temperature may be set to a temperature value that satisfies the condition that the cooling water of the integrated cooler 50 is below the limit temperature and a temperature condition for preventing heat damage to the hardware.

Accordingly, for determining the opening ratio of the gas valve 24 depending on the temperature of the LP-EGR gas (exhaust gas), a map for determining the opening ratio of the gas valve may be constructed in advance and stored in the controller 30. The controller 30 may variably control the opening ratio of the gas valve 24 using the map for determining the opening ratio of the gas valve.

By thus variably controlling operation of the gas valve 24, the hardware (including the gas passage, the gas valve, the oil pan, and the integrated cooler, etc.) in which LP-EGR gas flows is prevented from having heat damage, and the temperature of cooling water of the integrated cooler 50 may not exceed the limit temperature.

In addition, the controller 30 may control the opening ratio of the gas valve 24 to zero, based on a temperature of the hardware and the temperature of the cooling water of the integrated cooler 50 (referring to FIG. 4). When the temperature of the hardware is equal to or higher than a preset heat damage generation temperature or the temperature of the cooling water exceeds the preset limit temperature, the controller 30 may switch the gas valve 24 to a closed state. The heat damage generation temperature may be set to a temperature value at which any one of components of the hardware suffers heat damage. The temperature of the hardware may be detected by a hardware temperature sensor, and the temperature of the cooling water of the integrated cooler 50 may be detected by a cooling water temperature sensor.

Meanwhile, the integrated cooler 50 may be a cooler with an integrated function of an oil cooler for cooling engine oil and a LP-EGR gas cooler for cooling LP-EGR gas are integrated.

The integrated cooler 50 may cool the engine oil by heat exchange between oil and cooling water while cooling the LP-EGR gas by heat exchange between the cooling water and LP-EGR gas. The LP-EGR gas is cooled in the integrated cooler 50 by the cooling water and then discharged to a compressor side, and the engine oil is cooled in the integrated cooler 50 by the cooling water and then recovered to the oil pan 20.

Therefore, the gas passage 22 may pass through the integrated cooler 50 and be extended to the compressor 60 provided on a rear end of the integrated cooler 50. An oil passage 26 for circulating the engine oil may be disposed to pass through the integrated cooler 50. The gas passage 22 and the oil passage 26 may be disposed to be heat exchangeable with cooling water in the integrated cooler 50.

The cooling water may be circulated through a radiator provided on a vehicle body, and be heated by the engine oil and LP-EGR gas, and then be cooled by heat exchange with the atmosphere while passing through the radiator.

The compressor 60 is directly connected to a turbine of the turbo charger driven by exhaust gas, and is coaxially coupled to and co-rotates with the turbine. The turbine is rotated by flow energy of exhaust gas discharged from an engine 40 and moved to the exhaust purifier 10.

Although a preferred embodiment of the present invention has been described for illustrative purposes, the scope of the present invention is not limited thereto, and various modifications, additions and substitutions of those skilled in the art using the basic concept of the present invention as defined in the following claims are also included in the scope of the present invention.

What is claimed is:

1. A device for preventing dilution of engine oil, the device comprising:
    an oil pan in which oil for engine lubrication is recovered along with fuel;
    an exhaust purifier provided on a rear end of the engine;
    a gas passage located to guide flow of exhaust gas passing through the exhaust purifier to the oil pan;
    a gas valve for configured to control a flow rate of exhaust gas flowing in the gas passage; and
    a controller configured to control an opening ratio of the gas valve depending on a temperature of oil in the oil pan to maintain the temperature of the oil equal to or higher than a temperature at which the fuel in the oil pan is vaporized.

2. The device of claim 1, wherein the controller is configured to control the opening ratio of the gas valve to zero when the temperature of the oil in the oil pan is equal to or higher than a critical temperature.

3. The device of claim 1, wherein the gas passage is disposed to pass through the oil pan and wherein the oil and fuel in the oil pan are to be heated by exhaust gas flowing in the gas passage.

4. The device of claim 3, wherein the gas passage is disposed to pass through the oil pan and is extended to an integrated cooler and wherein the gas valve is provided on the gas passage between the oil pan and the integrated cooler.

5. The device of claim 4, wherein the controller is configured to control the opening ratio of the gas valve to zero when a temperature of the gas passage, the oil pan, or the integrated cooler is equal to or higher than a heat damage generation temperature.

6. The device of claim 4, wherein the integrated cooler is configured to cool exhaust gas passing through the oil pan by heat-exchange using cooling water.

7. The device of claim 6, wherein the cooling water can be circulated between the oil pan and the integrated cooler to cool the oil.

8. The device of claim 7, wherein the controller is configured to control the opening ratio of the gas valve to zero when a temperature of the cooling water of the integrated cooler for cooling the oil and exhaust gas exceeds a limit temperature.

9. The device of claim 6, wherein the exhaust gas cooled by the integrated cooler is discharged to a compressor side so as to be supplied to an engine side by a compressor.

10. The device of claim 9, wherein the gas passage passes through the integrated cooler and is extended to the compressor provided on a rear end of the integrated cooler.

11. The device of claim 9, wherein the compressor is configured to be driven by flow energy of exhaust gas discharged from the engine.

12. The device of claim 1, wherein the gas passage is disposed between the exhaust purifier disposed on the rear end of the engine and the oil pan, and wherein the exhaust purifier is configured to purify exhaust gas at a predetermined temperature condition for normal operation of the exhaust purifier.

13. A method for preventing dilution of engine oil, the method comprising:
   recovering oil for engine lubrication along with fuel in an oil pan;
   purifying exhaust gas at an exhaust purifier provided on a rear end of the engine;
   guiding flow of exhaust gas passing through the exhaust purifier to the oil pan; and
   controlling a flow rate of exhaust gas, the flow rate depending on a temperature of oil in the oil pan to maintain the temperature of the oil equal to or higher than a temperature at which the fuel in the oil pan is vaporized.

14. The method of claim 13, wherein the exhaust gas is purified at a predetermined temperature condition for normal operation of the exhaust purifier.

15. The method of claim 13, wherein the flow of exhaust gas is guided to pass through the oil pan so that the oil and fuel in the oil pan are heated by the exhaust gas.

16. The method of claim 15, further comprising cooling exhaust gas passing through the oil pan by heat-exchange using cooling water.

17. The method of claim 16, wherein the exhaust gas is purified at a predetermined temperature condition for normal operation of the exhaust purifier.

18. A device for preventing dilution of engine oil, the device comprising:
   an oil pan in which oil for engine lubrication is recovered along with fuel;
   an exhaust purifier provided on a rear end of the engine;
   a gas passage located to guide flow of exhaust gas passing through the exhaust purifier to through the oil pan, the oil and the fuel in the oil pan can be heated by exhaust gas flowing in the gas passage;
   an integrated cooler, wherein the gas passage extends to the integrated cooler;
   a gas valve provided on the gas passage between the oil pan and the integrated cooler, the gas valve configured to control a flow rate of exhaust gas flowing in the gas passage; and
   a controller the controller is configured to control an opening ratio of the gas valve based a temperature of the gas passage, the oil pan, or the integrated cooler.

19. The device of claim 18, further comprising a compressor configured to be driven by flow energy of exhaust gas discharged from the engine, wherein the gas passage passes through the integrated cooler and is extended to the compressor.

20. The device of claim 18, wherein the gas passage is disposed between the exhaust purifier and the oil pan and wherein the exhaust purifier is configured to purify exhaust gas at a predetermined temperature condition for normal operation of the exhaust purifier.

* * * * *